United States Patent [19]

Jow et al.

[11] Patent Number: 4,518,067
[45] Date of Patent: May 21, 1985

[54] AUTOMOBILE BRAKE DEVICE

[75] Inventors: Long S. Jow; Long J. Jow, both of Taipei, Taiwan

[73] Assignee: Transtech Industrial Corporation, Taipei, Taiwan

[21] Appl. No.: 341,802

[22] Filed: Jan. 22, 1982

[51] Int. Cl.³ ............................................. B60K 41/28
[52] U.S. Cl. ................................. 192/0.09; 192/3 H; 192/4 A
[58] Field of Search ................ 192/0.04, 0.062, 0.049, 192/0.09, 0.046, 3 H, 3.58, 4 A, 3.59; 137/280; 251/239, 243; 188/353; 74/520

[56] References Cited

U.S. PATENT DOCUMENTS

| | | | |
|---|---|---|---|
| 105,890 | 8/1870 | Bennett | 251/243 |
| 2,059,069 | 10/1936 | Weiss | 192/4 A |
| 2,080,632 | 5/1937 | Pohle | 192/4 A |
| 2,091,678 | 8/1937 | Freeman | 192/4 A |
| 2,135,897 | 11/1938 | Jameson | 192/4 A |
| 2,183,444 | 12/1939 | Collins | 188/353 |
| 2,187,789 | 1/1940 | Lanz | 192/4 A |
| 2,298,509 | 10/1942 | Phipps | 192/4 A |
| 2,497,557 | 2/1950 | Reeves | 251/243 |
| 2,727,599 | 12/1955 | Melfi | 192/0.049 |
| 3,322,246 | 5/1967 | Noguchi | 192/0.049 |
| 3,694,039 | 9/1972 | Kawabe et al. | 192/3 H |
| 4,072,220 | 2/1978 | Hamada | 192/3.59 |

Primary Examiner—George H. Krizmanich
Attorney, Agent, or Firm—Shoemaker and Mattare, Ltd.

[57] ABSTRACT

An automobile brake device comprising a control valve for controlling the flow of a working medium between a master braking unit and a wheel braking unit, the control valve having a passage for the working medium to flow through and a plunger for selectively opening and closing the passage, the plunger being provided with a toggle lever and a spring to resiliently urge the plunger into a open or closed position, the toggle lever being operable by hand to open and close the passage for the working medium, so as to facilitate the braking and the releasing of the brakes of an automobile while driving on a slope.

5 Claims, 10 Drawing Figures

AUTOMOBILE BRAKE DEVICE

BACKGROUND OF THE INVENTION

Automobiles are provided with a hand brake which is normally used to prevent the auotomobile from slipping when starting to move uphill from a stop on a slope. When the automobile is equipped with a friction clutch the drive has to coordinate the release of the hand brake in combination with the release of the clutch pedal and the depression of the accelerator pedal, all of which requires a certain degree of skill.

In view of the aforesaid difficulty with conventional hand brakes, this invention offers a novel, easily operable brake operating device to keep the automobile from slipping when starting to move uphill from a stop on a slope.

DETAILED DESCRIPTION OF THE INVENTION

Figure 1:
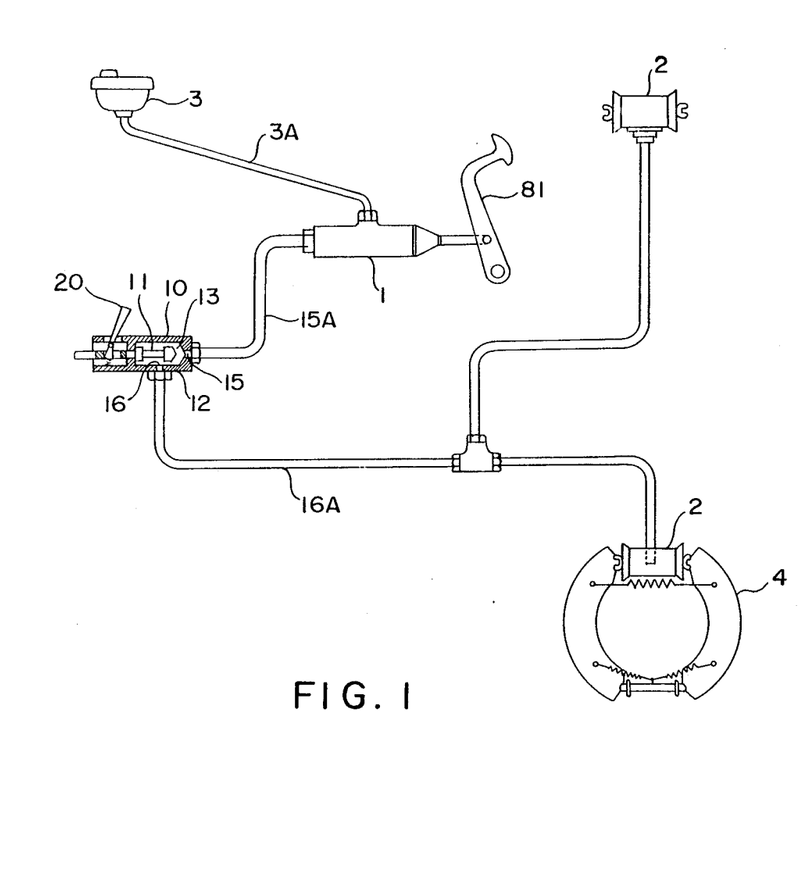
FIG. 1 is a schematic diagram showing the arrangement of a first embodiment of the brake operating device of this invention, wherein the control valve is open.

As shown in FIG. 1, the first embodiment of the brake device of this invention comprises a control valve 10 and a toggle lever 20, control valve 10 having a plunger 11, casing 12, valve chamber 13, valve passage or inlet port 15 and outlet port 16; inlet port 15 being connected to the master brake cylinder 1 of the automobile by brake tube 15A and outlet port 16 being connected to wheel cylinders 2 by brake tube 16A, wheel cylinders 2 being adapted to actuate wheel brakes 4. Master brake cylinder 1 is provided with a brake pedal 81 operable by foot and brake fluid reservoir 3 from which brake fluid is supplied to master brake cylinder 1 through tube 3A.

Figure 2:
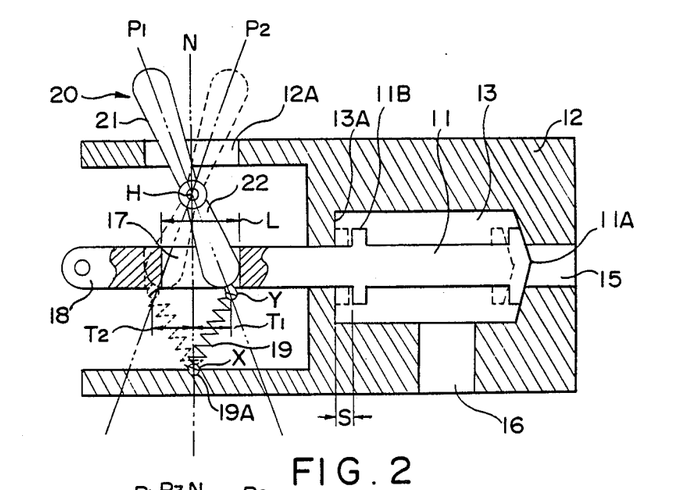
FIG. 2 is a schematic, enlarged cross-sectional view of the control valve employed in the device of this invention, wherein the control valve is closed.

As shown in FIG. 2, plunger 11 is provided with a conical shaped head 11A and a flange 11B and is slidably inserted into valve chamber 13, head 11A being adapted to selectively open or close inlet port 15 when plunger 11 is moved away from or towards inlet port 15. Plunger 11 is further provided with a tail end 18 extending out from valve chamber 13 and having a slot 17. Toggle lever 20 comprises a handle 21 and a tongue 22 and is pivotally mounted to casing 12 of control valve 10 by hinge H, tongue 22 being inserted into slot 17 and urged by a compression spring 19 from below, with handle 21 being extending outwardly through an opening 12A so as to be operable by hand. One end of spring 19 is pivotally supported by casing 12 with a ball 19A at X, and the other end thereof is coupled to end Y of tongue 22, so that toggle lever 20 can resiliently pivot with respect to hinge H from position P1 to position P2. In the drawing, N indicates a neutral position which is defined by an imaginary line N drawn to pass through hinge H and supporting point X of spring 19. Tongue 22 is inserted into slot 17 having length L, in such a manner that when toggle lever 20 is pivoted to position P1, plunger 11 is urged by spring 19 through tongue 22 to keep head 11A engaged with inlet port 15 so as to close inlet port 15 as shown in solid lines in FIG. 2, and when toggle lever 20 is pivoted to position P2, plunger 11 is urged by spring 19 through tongue 22 to keep head 11A disengaged from inlet port 15 so as to open inlet port 15 as shown in dotted lines in FIG. 2. Flange 11B abuts the end wall 13A of valve chamber 13 opposite to inlet port 15 so as to stop plunger 11 at the open position when toggle lever 20 is pivoted to position P2.

Length L of slot 17 is determined so that when toggle lever 20 is pivoted to position P1, end point Y of tongue 22 moves to one side of neutral line N a distance T1, and when toggle lever 20 is pivoted to position P2, end point Y of tongue 22 moves to the opposited side of neutral line N a distance T2 from neutral line N but plunger moves a distance S from its closed position, and S is so selected to be smaller than T1.

Figure 3:
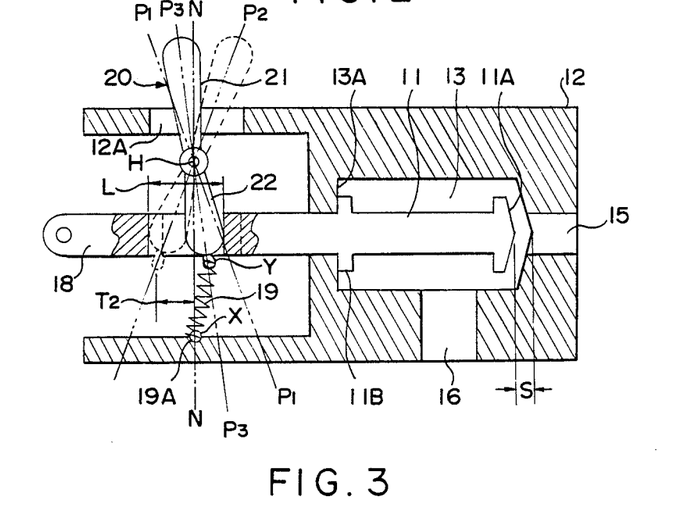
FIG. 3 is a schematic, enlarged cross-sectional view of the control valve employed in the device of this invention, wherein the control valve is open.

The above described arrangement will be more fully understood by referring to FIG. 3, wherein plunger 11 is moved from right to left, or from the close position to the open position by a means other than toggle lever 20, such means perhaps being the brake fluid pressure from inlet port 15 to act on head 11A of plunger 11. Thus end point Y is accordingly moved a distance equivalent to displacement S of plunger 11 to position P3, where end point Y remains in the right hand side of neutral line N since S is smaller than T1, and consequently plunger 11 is still being urged by spring 19 through tongue 22 toward inlet port 15, or toward its closed position. With flange 11B abutting end wall 13A, length L of slot 17 allows toggle lever 20 to be selectively pivoted to position P2 (as shown in dotted lines) where plunger 11 will be urged by spring 19 through tongue 22 in the opposite direction so as to keep head 11A away from inlet port 15, or at its open position.

The operation and function of the first embodiment of this invention will now be described.

In normal driving, toggle lever 20 is moved by hand to position P2 and kept in position P2 by spring 19, and inlet port 15 is kept open. Brake fluid is thus free to flow to and from master brake cylinder 1 and wheel cylinders 2 through control valve 10 and the wheel brakes operate as conventional automobile brakes do.

As soon as the automobile comes to an uphill slope and the driver wants to make a stop, toggle lever 20 is moved from position P2 to P1 so as to close inlet port 15. This can be done either before or after depressing brake pedal 81 (FIG. 1). If toggle lever 20 is moved to P1 to close inlet port 15 before depressing brake pedal 81, control valve 10 acts as a check valve allowing pressurized brake fluid to flow from master brake cylinder 1 to wheel cylinders 2 since plunger 11 will be pushed by the pressurized brake fluid from inlet port 15 to move away from inlet port 15, but as soon as brake pedal 81 is released to relieve the pressure of the brake fluid on inlet port 15, plunger 11 will be pushed by spring 19 through tongue 22 of toggle lever 20 towards inlet port 15 to close inlet port 15, thus blocking the return of brake fluid from wheel cylinders 2 to master brake cylinder 1, and therefore the brake fluid in wheel cylinders 2 is kept pressurized to keep the wheel brakes "on" after brake pedal 81 is released. If toggle lever 20 is moved to position P1 after brake pedal 81 is depressed, plunger 11 will be pushed by spring 19 towards inlet port 15 to close inlet port 15 as soon as brake pedal 81 is released, thus blocking the return of the brake fluid from wheel cylinders 2 to master brake cylinder 1, to keep the brake fluid in wheel cylinders 2 pressurized to keep the wheel brakes "on".

When the driver wants to move the automobile after making the stop as above, toggle lever 20 is moved from position P1 to position P2 as soon as the transmission is shifted into low gear and the clutch is engaged. Then inlet port 15 is open to allow the return of the brake fluid from wheel cylinders 2 to master brake cylinder 1 so as to release the wheel brakes.

With this arrangement, the braking force is produced by the brake fluid by depressing brake pedal 81; very little effort is required to operate toggle lever 20 in comparison with conventional hand brakes which require a certain hand force and skill to operate.

Figure 4:
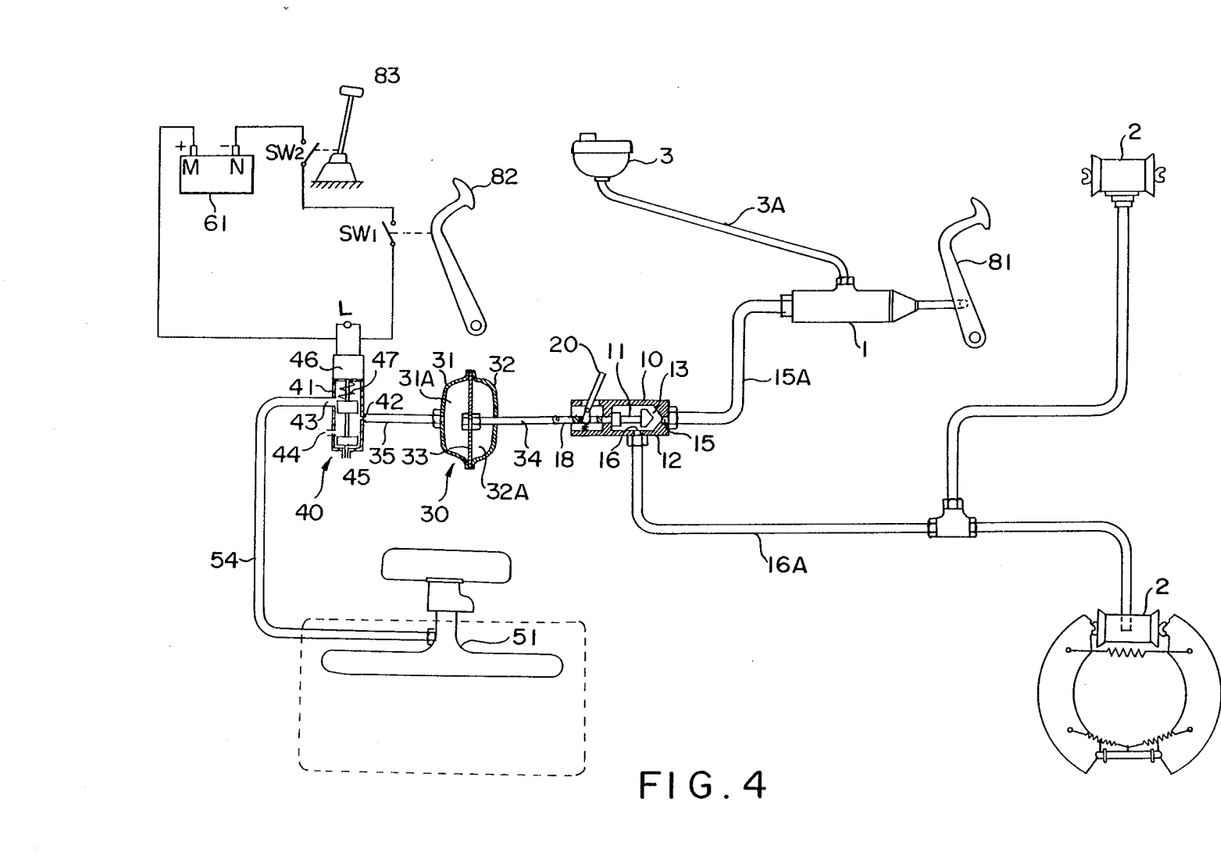
FIG. 4 is a schematic diagram showing the arrangement of a second embodiment of the device of this invention.

In FIG. 4 there is shown a second embodiment of the device of this invention. In this embodiment, the device comprises a control valve 10 and toggle lever 20 as in the first embodiment, and an actuator 30 having a connecting rod 34 connected to tail end 18 of plunger 11 of control valve 10, and a solenoid valve 40. Actuator 30 comprises first half casing 31 and second half casing 32; a flexible diaphragm 33 disposed in between first half casing 31 and second half casing 32 to form an acting chamber 31A on one side and a free chamber 32A on the opposite side; and a connecting rod 34 having one end fixedly connected to diaphragm 33 and the other end freely extending through free chamber 32A and second half casing 32 to connect to tail end 18 of plunger 11. First half casing 31 is provided with a tube 35 which communicates acting chamber 31A with first port 42 of solenoid valve 40.

Solenoid valve 40 comprises a solenoid 46; a three way valve having casing 41, first port 42, second port 43, third port 44, piston valve 45 and spring 47. Piston valve 45 is normally urged by spring 47 into a first position where first port 42 and third port 44 communicate with each other, and is adapted to be pulled to a second position when solenoid 46 is energized, where first port 42 and second port 43 communicate with each other. Second port 43 is connected to the intake manifold 51 of the automobiles engine by tube 54 so that when solenoid 46 is energized to pull piston valve 45 to second position, intake manifold 51 is caused to communicate with acting chamber 31A through tube 54, second port 43, first port 42, and tube 35, thus creating a vacuum in acting chamber 31A. Third port 44 is open to the atmosphere so that when piston valve 45 is at the first position, or solenoid 46 is de-energized, acting chamber 31A communicates with the atmosphere and second port 43 is closed.

Solenoid 46 is electrically connected to an electrical power source 61 through first switch SW1 operable in association with clutch pedal 82, and second switch SW2 operable in association with transmission shift lever 83; first switch SW1 being connected in series with second switch SW2. First switch SW1 is caused to open when clutch pedal 82 is fully depressed or the clutch is completely disengaged, and is caused to close when clutch pedal 82 is partially released or the clutch is being engaged. Second switch SW2 is caused to open when transmission shift lever 83 is in the neutral position, and is caused to close when transmission shift lever 83 is in any of the gear positions.

The second embodiment enables an automatic opening of inlet port 15 of control valve 10 without the need of moving toggle lever 20 from position P1 to P2 when moving the automobile from a stop on an uphill slope. This automatic opening of inlet port 15 is performed by first, depressing clutch pedal 82; second, shifting transmission shift lever to a low gear position (wherein second switch SW2 is closed); and third, slowly releasing clutch pedal 82 (thus first switch SW1 is closed) and depressing the accelerator pedal, not shown. The above process causes solenoid 46 to be energized, and a vacuum is created in acting chamber 31A of actuator 30 to act on diaphragm 33 to pull connecting rod 34, and consequently plunger 11 away from inlet port 15 to open inlet port 15. In other words, as long as the automobile is being driven, the clutch is engaged, and the transmission is in a driving position, acting chamber 31A is kept communicating with the intake manifold 51 and vacuum is maintained therein, and as a result inlet port 15 is kept open to enable a normal driving of the automobile. If the driver wants to make a second stop on the same uphill slope, the automobile can be stopped and kept stopped on the slope without the need of moving toggle lever 20 because either first switch SW1 or second switch SW2 will be caused to open when the automobile is brought to a stop, and solenoid 46 is thus de-energized to break the vacuum in acting chamber 31A. As a result plunger 11, being urged by spring 19 as toggle lever 20 is at position P3, is pushed towards inlet port 15 to close inlet port 15 and in the meantime toggle lever moves to position P1 along with plunger 11. Therefore the wheels will remain braked after the automobile is brought to a stop for the second time on the same slope. While toggle lever 20 is in position P1 and inlet port 15 is closed, the automobile can be moved after making the second stop without moving toggle lever 20 by hand to open inlet port 15 because inlet port 15 will be opened as soon as the transmission is in a driving gear position and the clutch is being engaged, as described above. As soon as the automobile is brought onto a level road for normal driving, lever 20 may be moved by hand to position P2. In the drawing, L is an indicator lamp connected across solenoid 46 so as to be lit when solenoid 46 is energized.

Figure 5:
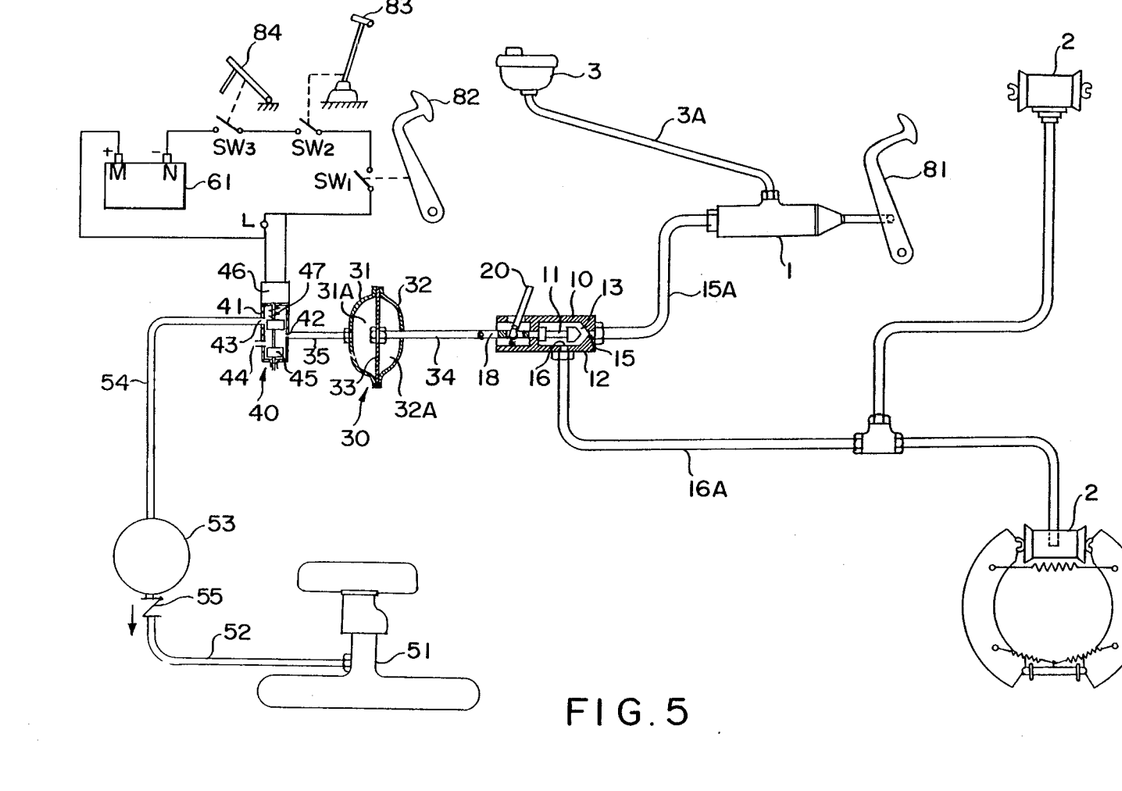
FIG. 5 is a schematic diagram showing the arrangement of a third embodiment of the device of this invention.

FIG. 5 shows a third embodiment of this invention.

In addition to control valve 10, toggle lever 20, actuator 30, and solenoid valve 40 arranged as described above, the third embodiment further comprises a third switch SW3 connected in series with first switch SW1 and second switch SW2, said third switch SW3 being operable in association with accelerator pedal 84; and a vacuum tank 53 provided with a check valve 55. Second port 43 of solenoid valve 40 is connected to vacuum tank 53 with tube 54, and vacuum tank 53 is connected to intake manifold by tube 52 through check valve 55. When the engine is running, vacuum is always formed and maintained in vacuum tank 53. Check valve 55 is adapted to prevent the drop of the intensity of the vacuum in vacuum tank 53 when engine speed decreases and the vacuum in the intake mainifold 51 decreases, so that a generally steady vacuum is maintained in vacuum tank 53. Third switch SW3 is caused to close when accelerator pedal 84 is depressed, and is caused to open when accelerator pedal 84 is released.

With this arrangement, plunger 11 with toggle lever 20 at position P1 (closed position) will be pulled to open inlet port 15 when the transmission shift lever is in a driving gear position (second switch SW2 is closed), the clutch is being engaged (first switch SW1 is closed) and the engine is being accelerated (third switch SW3 is closed). This embodiment further assures a smooth moving of the automobile from a stop on an uphill slope.

Figure 6:
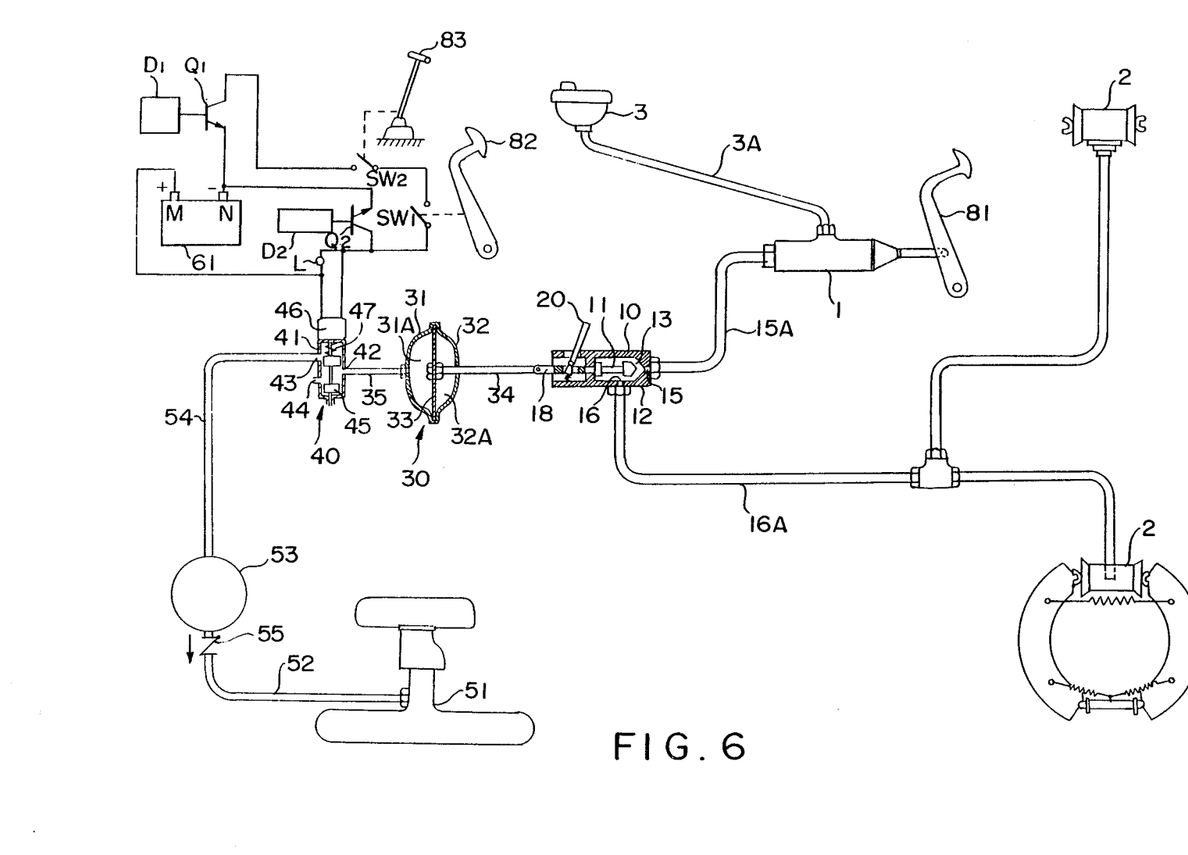
FIG. 6 is a schematic diagram showing the arrangement of a fourth embodiment of the device of this invention.

FIG. 6 shows a fourth embodiment of this invention. The device of this embodiment further comprises a first switching transistor Q1 connected in series with first and second switches SW1 and SW2, said first switching transistor Q1 being operable by an engine speed detector D1; and a second switching transistor Q2 shunted across first switch SW1, second switch SW2, and first switching transistor Q1, said second switching transistor Q2 being operable by a driving speed detector D2 in addition to the arrangement of the third embodiment, except that third switch SW3 of the third embodiment is eliminated.

Figure 7:
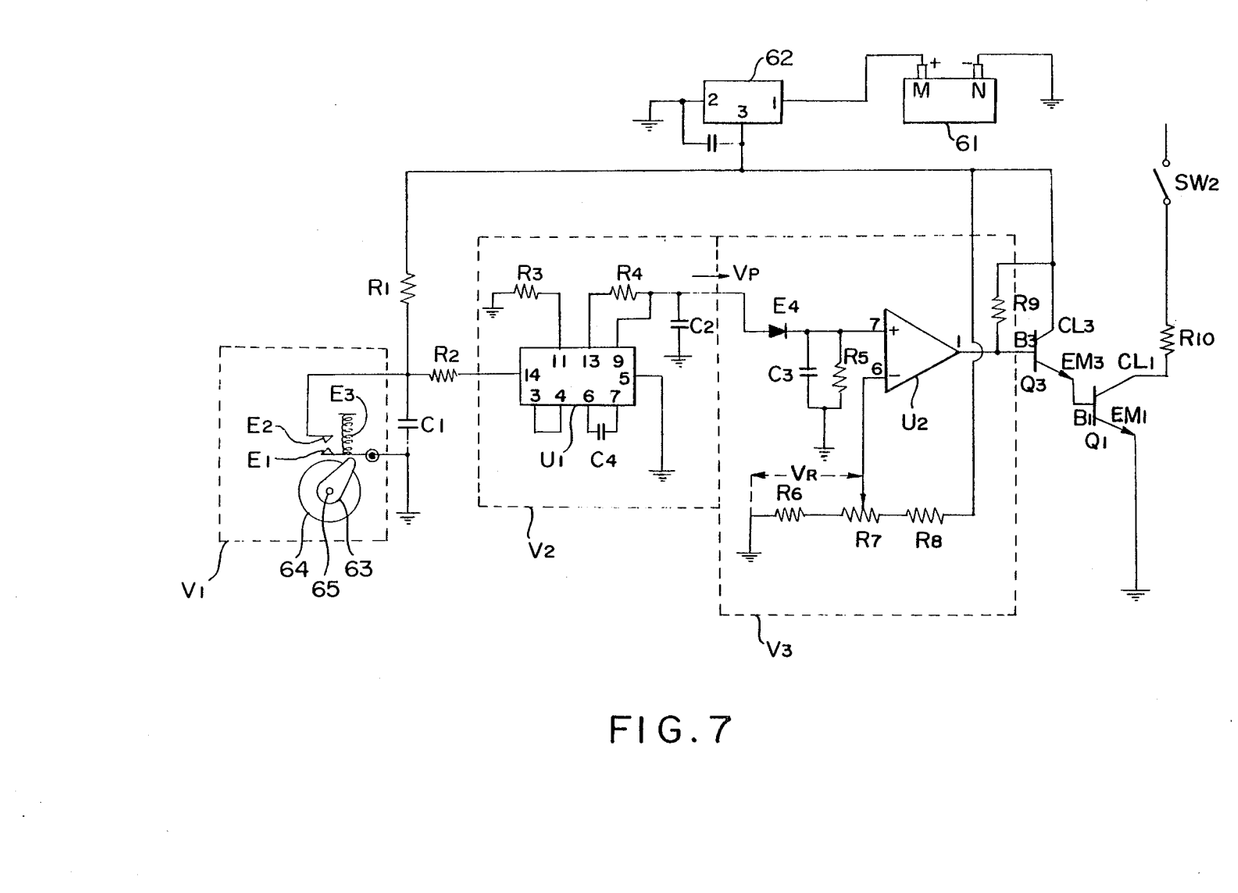
FIG. 7 is an electric circuit diagram of the engine speed detector employed in the fourth embodiment as shown in FIG. 6.

FIG. 7 shows an electrical circuit diagram of the engine speed detector D1, which comprises an input unit V1, frequency-voltage converter V2, comparator V3 and an amplifying transistor Q3.

Input unit V1 comprises a cam 63 fixedly mounted onto a shaft to be driven by wheel 64 which is driven by a fan belt of the automobile engine, not shown, a movable contact point E1, a fixed contact point E2, movable contact point E1 being adapted to make a contact engagement with fixed contact point E2 when cam 63 rotates to push movable contact point E1 towards fixed contact point E2, and to be pushed by spring E3 to disengage from fixed contact point E2, so that movable contact point E1 comes into contact with fixed contact point E2 once per each rotation of cam 63. Fixed contact point E2 is electrically connected to terminal 3 of an IC unit 62 which is IC No. 7805 having terminal 1 connected to the plus end M of electrical power source 61 which has a minus(−) end connected to the chassis, not shown, or ground(  ); and movable contact point E1 is electrically connected to the ground. IC unit 62 is adapted to convert the voltage of 12 volts from electrical power source 61 to 5 volts to be applied to the engine speed detector system. Capacitor C1 is connected across movable contact point E1 and fixed contact point E2.

Frequency-Voltage converter V2 comprises a conversion unit U1, which is an integrated circuit No. CD4046 having terminals 3, 4, 5, 6, 7, 9, 11, 13 and 14 of which terminal 14 is connected to fixed contact point E2 by resistor R2, terminal 3 is connected to terminal 4, terminal 6 is connected to terminal 7 by capacitor C4, terminal 5 is connected to the minus (−) end N of electrical power source 61, or ground, terminal 11 is connected to the ground by resistor R3, terminal 13 is connected to terminal 9 by resistor R4, terminal 9 is further connected to the ground by capacitor C2.

Comparator V3 comprises a comparing unit U2 which is an integrated circuit No. LM339 having terminals No. 1, 6 and 7; and a diode E4 having a cathod connected to terminal 9 of frequency-voltage conversion unit U1, and an anode connected to terminal 7 of comparing unit U2, said terminal 7 of comparing unit U2 being also connected to the ground by resistor R5 having capacitor C3 connected in parallel with resistor R5. Terminal 6 of comparing unit U2 is variably connected to variable resistor R7 having one end connected to resistor R6 for connection with the ground and another end connected to resistor R8 for connection with terminal 3 of IC unit 62. Terminal 1 of comparing unit U2 is connected to base B3 of amplifying transistor Q3, said amplifying transistor Q3 having collector CL3 connected to the plus (+) end M of electrical power source 61 through IC unit 62, and also to terminal 1 of comparing unit U2 by resistor R9. Amplifying transistor Q3 is further provided with emitter EM3 which is connected to first switching transistor Q1 to be described below.

First switching transistor Q1 comprises base B1 connected to emitter EM3 of amplifying transistor Q3, collector CL1 connected to second switch SW2, and emitter EM1 connected to the ground.

Figure 8:
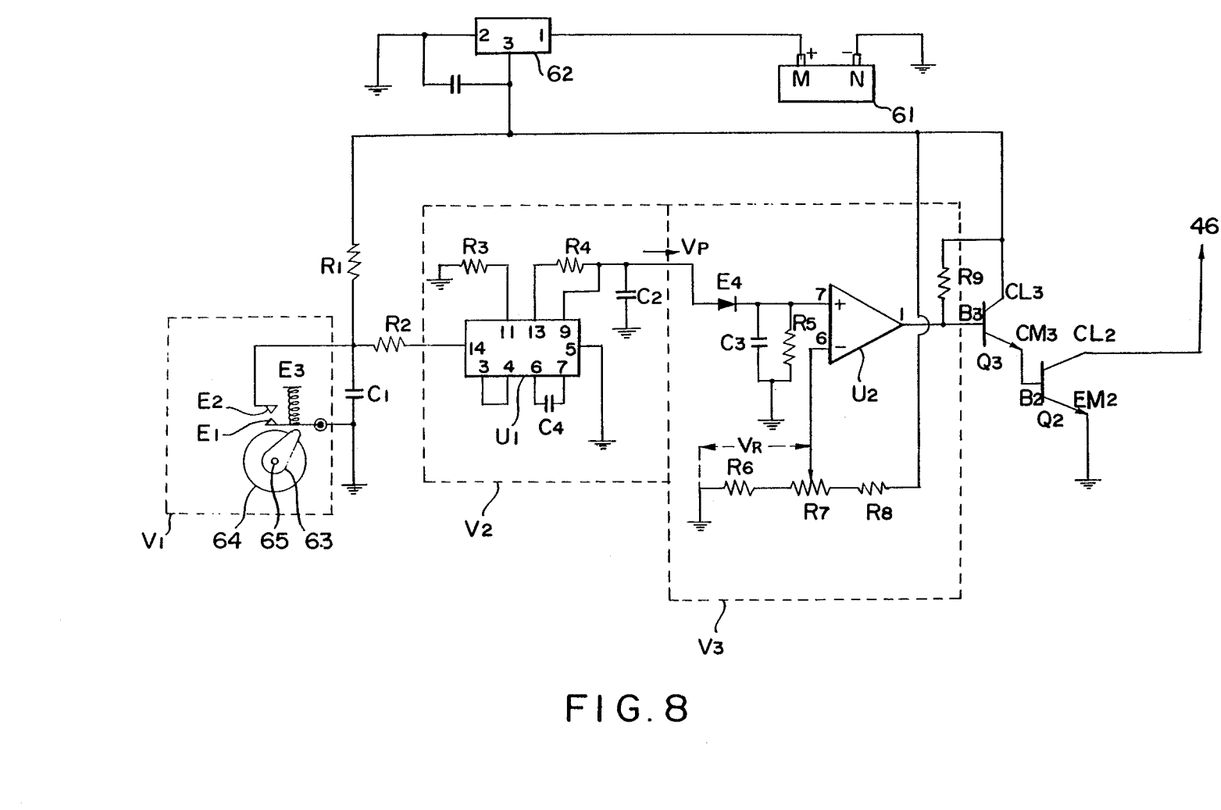
FIG. 8 is an electric circuit diagram of the driving speed detector employed in the fourth embodiment as shown in FIG. 6.

FIG. 8 shows an electrical circuit diagram of driving speed detector D2, which is identical to engine speed detector D1 except that wheel 64 is driven by the propeller shaft of the automobile with a belt or is operatively coupled to a speedometer drive axle of the automobile, and emitter EM3 of amplifying transistor Q3 is connected to base B2 of second switching transistor Q2 having collector CL2 connected to the connection of solenoid 46 and first switch SW1 and emitter EM2 connected to the ground.

Referring back to FIG. 7, a series of electrical pulses at a certain frequency is produced by input unit V1 when the automobile engine runs and cam 63 is rotated. The series of electrical pulses is then fed to and converted by frequency-voltage convertor V2 to a steady output voltage Vp in proportion to the engine speed. The output voltage Vp is then applied to comparator V3 and compared with a divisional voltage $V_R$ predeterminedly formed between terminal 6 and the ground. If output voltage Vp is higher than divisional voltage $V_R$, an end voltage is produced to be applied to amplifying transistor Q3, which in turn activates first switching transistor Q1 to allow electric current to flow through collector CL1 and emitter EM1. On the other hand if output voltage Vp is lower than divisional voltage $V_R$, no voltage will be produced at terminal 1 and thus first switching transistor Q1 will not be activated, and therefore no electric current will be allowed to flow through collector CL1 and emitter EM1.

In other words, when the engine speed is below a certain pre-selected speed, first switching transistor Q1 is "open" and solenoid 46 of solenoid valve 40 is de-energized; when then engine speed is above the pre-selected speed, first transistor Q1 is "closed" and solenoid 46 of solenoid valve will be energized if first switch SW1 and second switch SW2 are closed.

The pre-selected speed can be changed by changing the resistance valve of variable resistor R7 so as to vary divisional voltage $V_R$.

Similarly, driving speed detector D2 and second switching transistor Q2 as shown in FIGS. 5 and 8 cause solenoid 46 of solenoid valve 40 to be de-energized when the driving speed is below a certain speed, and to be energized when the driving speed is over the certain speed.

The fourth embodiment enables inlet port 15 to open when the driving speed of the automobile is over a certain speed, or the clutch is being engaged, the transmission is in a driving gear position and the engine speed is over a certain speed.

Therefore, the arrangement according to the fourth embodiment provides a completely automatic operation for releasing the brake after making a stop with toggle lever 20 in position P1.

Figure 9:
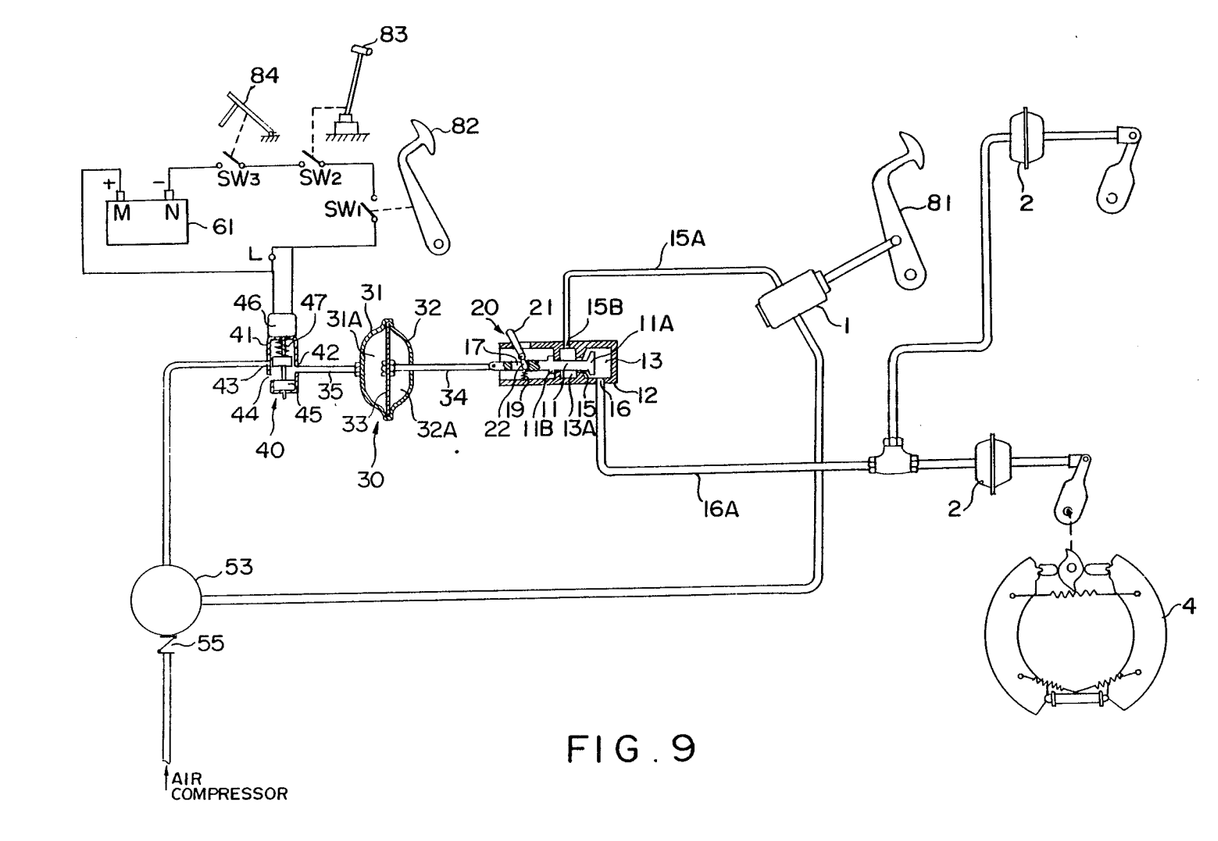
FIG. 9 is a schematic diagram showing the arrangement of a fifth embodiment of the device of this invention.

FIG. 9 shows a fifth embodiment of the device of this invention. This embodiment is adapted to the use of compressed air which is available in certain automobiles equiped with air brakes instead of hydraulic brakes. In this embodiment, control valve 10 is modified as the detail shown in FIG. 10, so that plunger 11 moves in an opposite direction to open or to close valve passage 15. Control valve 10 is adapted to control the flow of compressed air between the treadle valve 1 operable by brake pedal 81 and the wheel brake chamber 2 adapted to actuate wheel brakes 4. Compressed air is supplied to treadle valve 1 from compressed air tank 53 in which the compressed air is maintained as in a conventional air brake system. Second port 43 of solenoid valve 40 is connected to compressor air tank 53 so that the compressed air is admitted to acting chamber 31A of actuator 30 when solenoid 46 is energized. Connecting rod 34 is thus pushed, instead of being pulled, to move plunger 11 to open inlet port 15.

Figure 10:
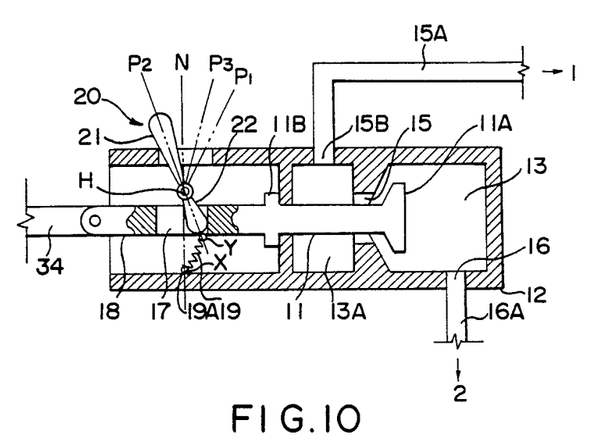
FIG. 10 is a schematic, cross-sectional view of a modified control valve for use with compressed air.

As shown in FIG. 10, control valve 10 employed in this embodiment comprises a casing 12, first valve chamber 13 adapted to communicate with wheel brake chambers 2 by tube 16A, second valve chamber 13A adapted to communicate with treadle valve 1 by tube 15A, valve passage 15, communicating first and second valve chambers 13 and 13A, plunger 11 slidably disposed in first and second valve chambers 13 and 13A and having a head 11A formed at the end thereof, said head 11A being adapted to close from first chamber 13 side passage 15 when plunger 11 is pulled to retract, and to open passage 15 when plunger 11 is pushed to move forwards. Plunger 11 is further provided with a flange 11B, tail end 18, slot 17, toggle lever 20 and spring 19 as described in the first and second embodiments, tail end 18 being connected to connecting rod 34 of actuator 30.

The arrangement of solenoid valve 40, first switch Sw1, second switch SW2 and third switch SW3 is the same as those of the third embodiment.

Although it is not shown in the drawing, it is to be understood that the third switch SW3 may be eliminated and the first switching transistor Q1 with engine speed detector D1 and the second switching transistor Q2 with driving speed detector D2 may be employed in combination with the arrangement of the fifth embodiment.

Furthermore, it is to be understood that control valve 10 and the vacuum system employed in the third embodiment can be used in an air brake system wherein the treadle valve replaces the master brake cylinder to act as a master braking unit, and the wheel brake chamber replaced the wheel brake cylinder to act as a wheel braking unit.

While preferred embodiments of the automobile brake device of this invention have been described by way of example, it is to be understood that the construction and arrangement can be otherwise modified without departing from the principles and scope of this invention as defined in the appended claims.

What is claimed is:

1. An automobile brake device, comprising:
   (a) a master braking unit operable by foot and adapted to deliver a working medium for braking an automobile having wheel brakes, a clutch pedal, a transmission shift lever and an accelerator pedal,
   (b) a wheel braking unit operable by said working medium to actuate said wheel brakes;
   (c) a control valve having a passage through which said working medium flows between said master braking unit and said wheel braking unit and a plunger adapted to selectively open and close said passage,
   (d) a toggle lever operable by hand to move from a first position to a second position, said toggle lever being provided with a resilient member and operatively connected to said plunger so that when said toggle lever is in the first position said toggle lever is urged by said resilient member to urge said plunger to be in a closed position to close said passage, and when said toggle lever is in the second position said toggle lever is urged by said resilient member to urge said plunger to be in an open position to open said passage, said toggle lever being arranged in a third position where said plunger is in said open position and remains being urged by said toggle lever and said spring toward said closed position;
   (e) an actuator having a connecting rod connected to said plunger and an acting chamber to which a working means may be applied for operating said connecting rod;
   (f) a solenoid valve having a solenoid to be selectively energized by electrical power and valve means operable by said solenoid, said valve means being so connected to said actuator that said working means is applied to said acting chamber through said valve means to cause said connecting rod to move in one direction when said solenoid is energized, and said working means is released from said acting chamber to allow said connecting rod to move in the opposite direction when said solenoid is de-energized; and
   (g) a first switch and a second switch connected in series with the first switch for connecting said solenoid to an electrical power source, said first switch being caused to open when said clutch pedal is depressed and to close when the clutch pedal is released; said second switch being caused to open when said transmission shift lever is in a neutral position and to close when said transmission shift lever is in a driving gear position.

2. An automobile brake device as recited in claim 1, wherein said working medium is a brake fluid, said master braking unit is a master brake cylinder and said wheel braking unit is a wheel brake cylinder.

3. An automobile brake device as recited in claim 1, wherein said working medium is a compressed air, said master braking unit is a treadle valve and said wheel braking unit is a wheel brake chamber.

4. An automobile brake device as recited in claim 1, wherein said working means is a vacuum produced in an intake manifold of the automobiles engine.

5. An automobile brake device as recited in claim 1, wherein said working means is a compressed air.

* * * * *